United States Patent
Thogersen et al.

(10) Patent No.: US 8,800,307 B2
(45) Date of Patent: Aug. 12, 2014

(54) CONTROLLING CHILLED STATE OF A CARGO

(71) Applicants: Thermo King Corporation, Minneapolis, MN (US); Johnson Controls Technology Company, Plymouth, MI (US)

(72) Inventors: Ole Thogersen, Nyborn (DK); Allan Dyrmose, Bogense (DK); Dan Vad Steffensen, Spentrup (DK)

(73) Assignees: Thermo King Corporation, Minneapolis, MN (US); Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 14/082,299

(22) Filed: Nov. 18, 2013

(65) Prior Publication Data

US 2014/0069126 A1    Mar. 13, 2014

Related U.S. Application Data

(62) Division of application No. 12/604,003, filed on Oct. 22, 2009, now Pat. No. 8,607,582.

(60) Provisional application No. 61/108,090, filed on Oct. 24, 2008.

(51) Int. Cl.
  *F25D 21/12* (2006.01)
  *F25B 1/00* (2006.01)
  *F25B 49/00* (2006.01)
  *F25D 21/00* (2006.01)
  *F25B 29/00* (2006.01)
  *F25B 41/00* (2006.01)

(52) U.S. Cl.
  USPC ........ 62/82; 62/115; 62/126; 62/151; 62/159; 62/208

(58) Field of Classification Search
  USPC ......... 62/62, 81, 82, 115, 117, 126, 127, 151, 62/159, 160, 196.4, 208, 212; 165/254, 165/256, 261
  See application file for complete search history.

(56) References Cited

U.S. PATENT DOCUMENTS

| 3,692,100 A | 9/1972 | Gallagher, Jr. |
| 4,137,057 A | 1/1979 | Piet et al. |
| (Continued) | | |

FOREIGN PATENT DOCUMENTS

| JP | S58-200973 | 11/1983 |
| JP | H02-122182 | 5/1990 |
| (Continued) | | |

*Primary Examiner* — Ljiljana Ciric
(74) *Attorney, Agent, or Firm* — Hamre, Schumann, Mueller & Larson, P.C.

(57) ABSTRACT

A method for operating a refrigeration system for a container for refrigerating chilled cargo includes providing a refrigeration system including a compressor and an evaporator fan associated with an evaporator. The method also includes determining the temperature of supply air and the temperature of return air. The method further includes determining one of a requirement for heating and a requirement for cooling based on the temperature of the return air and the temperature of the supply air. The method additionally includes activating the evaporator fan when a requirement for heating is determined and increasing the speed of the evaporator fan when increased heating is determined. The method also includes activating the compressor and the evaporator fan when a requirement for cooling is determined and increasing the power supplied to the compressor and maintaining the evaporator fan at a first speed when increased cooling is determined.

11 Claims, 2 Drawing Sheets

(56) References Cited

U.S. PATENT DOCUMENTS

| | | | |
|---|---|---|---|
| 4,357,988 A | 11/1982 | Hudson et al. | |
| 4,509,586 A | 4/1985 | Watabe | |
| 4,663,725 A | 5/1987 | Truckenbrod et al. | |
| 4,787,214 A | 11/1988 | Stillwell | |
| 4,789,025 A | 12/1988 | Brandemuehl et al. | |
| 4,790,143 A | 12/1988 | Hanson | |
| 4,899,549 A | 2/1990 | Berge et al. | |
| 4,912,933 A | 4/1990 | Renken | |
| 4,949,550 A | 8/1990 | Hanson | |
| 4,977,752 A | 12/1990 | Hanson | |
| 5,123,251 A | 6/1992 | Hanson | |
| 5,123,252 A | 6/1992 | Hanson | |
| 5,123,253 A | 6/1992 | Hanson et al. | |
| 5,140,825 A | 8/1992 | Hanson et al. | |
| 5,140,826 A | 8/1992 | Hanson et al. | |
| 5,161,383 A | 11/1992 | Hanson et al. | |
| 5,161,384 A | 11/1992 | Hanson et al. | |
| 5,168,713 A | 12/1992 | Howland | |
| 5,172,561 A | 12/1992 | Hanson et al. | |
| 5,181,389 A | 1/1993 | Hanson et al. | |
| 5,186,015 A | 2/1993 | Roehrich et al. | |
| 5,197,670 A | 3/1993 | Hanson et al. | |
| 5,201,185 A | 4/1993 | Hanson et al. | |
| 5,201,186 A | 4/1993 | Hanson | |
| 5,222,368 A | 6/1993 | Hanson | |
| 5,228,301 A | 7/1993 | Sjoholm et al. | |
| 5,249,429 A | 10/1993 | Hanson | |
| 5,295,364 A | 3/1994 | Truckenbrod et al. | |
| 5,303,560 A | 4/1994 | Hanson et al. | |
| 5,355,692 A | 10/1994 | Brownfield | |
| 5,377,493 A | 1/1995 | Friedland | |
| 5,415,006 A | 5/1995 | Renken et al. | |
| 5,456,088 A | 10/1995 | Hanson et al. | |
| 5,557,938 A | 9/1996 | Hanson et al. | |
| 5,557,941 A | 9/1996 | Hanson et al. | |
| 5,572,879 A | 11/1996 | Harrington et al. | |
| 5,579,648 A | 12/1996 | Hanson et al. | |
| 5,596,878 A | 1/1997 | Hanson et al. | |
| 5,634,347 A | 6/1997 | Hanson et al. | |
| 5,669,223 A | 9/1997 | Haley et al. | |
| 5,778,690 A | 7/1998 | Hanson et al. | |
| 6,058,716 A | 5/2000 | Reason et al. | |
| 6,095,427 A | 8/2000 | Hoium et al. | |
| 6,179,212 B1 | 1/2001 | Banko | |
| 6,367,269 B1 | 4/2002 | Hanson et al. | |
| 6,560,978 B2 | 5/2003 | Renken et al. | |
| 6,584,785 B1 | 7/2003 | Karl | |
| 6,609,388 B1 | 8/2003 | Hanson | |
| 6,679,074 B2 | 1/2004 | Hanson | |
| 6,708,510 B2 | 3/2004 | Sulc et al. | |
| 6,826,921 B1 * | 12/2004 | Uselton | 62/160 |
| 6,829,523 B2 | 12/2004 | Hanson | |
| 6,860,114 B2 * | 3/2005 | Jacobsen | 62/196.4 |
| 6,862,499 B1 | 3/2005 | Cretella et al. | |
| 6,895,764 B2 | 5/2005 | Viegas et al. | |
| 6,910,341 B2 | 6/2005 | Srichai et al. | |
| 7,080,521 B2 | 7/2006 | Ludwig et al. | |
| 7,201,006 B2 * | 4/2007 | Kates | 62/208 |
| 7,216,697 B2 | 5/2007 | Odeskog et al. | |
| 7,260,946 B2 | 8/2007 | Ludwig et al. | |
| 7,266,961 B2 | 9/2007 | Ludwig et al. | |
| 7,275,377 B2 * | 10/2007 | Kates | 62/208 |
| 7,343,751 B2 * | 3/2008 | Kates | 62/208 |
| 7,424,343 B2 * | 9/2008 | Kates | 62/126 |
| 7,765,818 B2 * | 8/2010 | Buck | 62/126 |
| 7,765,831 B2 | 8/2010 | Rodriguez et al. | |
| 7,900,465 B2 * | 3/2011 | Wetekamp et al. | 62/208 |
| 8,136,363 B2 | 3/2012 | Ludwig | |
| 8,307,667 B2 * | 11/2012 | Rusignuolo et al. | 62/115 |
| 2003/0029178 A1 | 2/2003 | Zentner et al. | |
| 2003/0182952 A1 | 10/2003 | Brooke | |
| 2010/0106302 A1 | 4/2010 | Thogersen et al. | |
| 2010/0106303 A1 | 4/2010 | Thogersen et al. | |
| 2011/0146311 A1 | 6/2011 | Thogersen et al. | |

FOREIGN PATENT DOCUMENTS

| | | |
|---|---|---|
| JP | H11-101542 | 4/1999 |
| JP | 2005201532 | 7/2005 |
| JP | 2007101170 | 4/2007 |

\* cited by examiner

CONTROLLING CHILLED STATE OF A CARGO

FIELD OF THE INVENTION

This invention relates to climate control in cargo containers and to devices for controlling the climate in cargo containers. In particular the invention relates to refrigeration systems for use in cargo containers and methods for operating such systems for controlling a cargo in a chilled state.

BACKGROUND OF THE INVENTION

The present invention relates to transporting and storing temperature sensitive cargo over long periods of time using a controlled climate in the space where the cargo is loaded. Climate control includes controlling the temperature of the cargo within a certain acceptable range. Controlling the temperature includes bringing the temperature of the cargo into the acceptable range (by refrigerating or heating) and maintaining the temperature within that range. Climate control may also include controlling other parameters such as humidity and composition of the atmosphere.

Refrigeration is the process of removing heat from an enclosed space, or from a substance, and moving it to a place where it is unobjectionable. The primary purpose of refrigeration is lowering the temperature of the enclosed space or substance and then maintaining that lower temperature.

One commonly used refrigeration technique is the vapor-compression cycle. The vapor-compression cycle is used in most household refrigerators as well as in many large commercial and industrial refrigeration systems.

A refrigerated container or reefer is a shipping container used in intermodal freight transport, including rail, ship and truck, where the cargo is refrigerated (chilled or frozen) for the transportation of temperature sensitive cargo. A reefer will usually have an integral refrigeration unit.

The reliability of the refrigeration unit is of paramount importance. The temperature of temperature sensitive cargo should be kept within predefined limits. Some cargo must be maintained frozen, and the temperature of any part of the frozen cargo must be kept below a predefined freezing temperature which depends on the cargo, e.g. below −18 degrees C. or lower, while other cargo, in particular commodities such as fresh meat, fresh fruit and vegetables, should be kept chilled to stay fresh, but not frozen. For chilled fruit and vegetables there is a lowest acceptable temperature below which the commodity will begin degrading and loose its freshness. Such temperature is dependent upon the type of fruit.

SUMMARY OF THE INVENTION

In one embodiment, the invention provides a method and a system for controlling the temperature of a cargo in a chilled state. In chilled state the cargo is to be maintained at or near a set-point temperature $T_{SP}$ and for certain commodities and not below the set-point temperature. Whether heating or refrigeration is required the invention ensures a minimal consumption of energy with proper use of forced air circulation, refrigeration and heating depending on the actual requirement.

In one embodiment, the invention provides a method for operating a refrigeration system for a container for refrigerating chilled cargo. The method includes providing a refrigeration system including a compressor, a condenser, and an evaporator connected in series, an evaporator fan associated with the evaporator, and a heater. The method also includes determining the temperature of the supply air discharged into the container and the return air from the container, and determining one of a requirement for heating and a requirement for cooling based on the temperature of the return air and the temperature of the supply air. The method further includes activating the evaporator fan when a requirement for heating is determined and increasing the speed of the evaporator fan when increased heating is determined, and activating the compressor and the evaporator fan when a requirement for cooling is determined and increasing the power supplied to the compressor and maintaining the evaporator fan at a first speed when increased cooling is determined.

Another embodiment of the invention is directed to a refrigeration system for a container for refrigerating chilled cargo. The system includes a compressor, a condenser, and an evaporator connected in series. The system also includes a heater and an evaporator fan associated with the evaporator, where the evaporator fan is operable to discharge supply air to the container and to receive return air from the container. The system further includes sensors configured to sense the temperature of the supply air and the temperature of the return air. The controller is programmed to determine one of a requirement for heating and a requirement for cooling based on the temperature of the return air and the temperature of the supply air. Where the controller is further programmed to activate the evaporator fan when a requirement for heating is determined and to increase the speed of the evaporator fan when increased heating is determined. Where the controller is programmed to activate the compressor and the evaporator fan when a requirement for cooling is determined and to increase the power supplied to the compressor and maintain the evaporator fan at a first speed when increased cooling is determined.

Other aspects of the invention will become apparent by consideration of the detailed description and accompanying drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
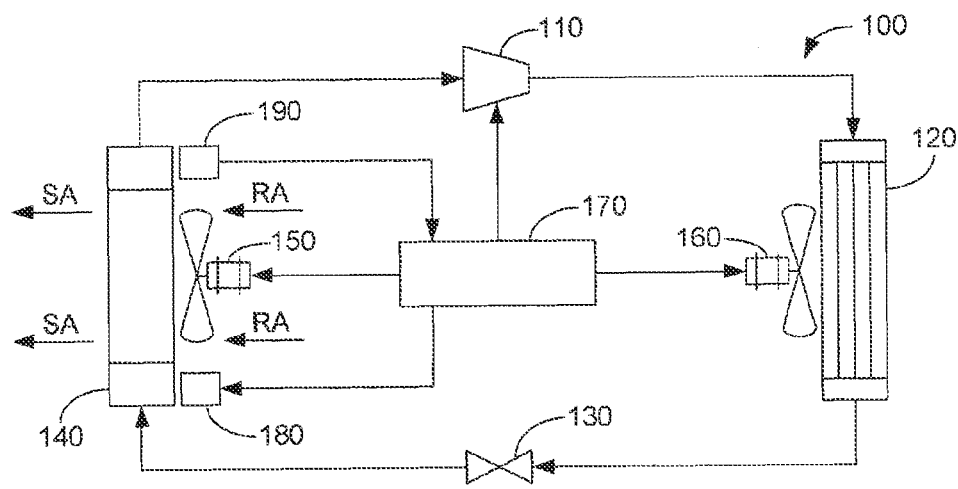
FIG. 1 shows schematically a refrigeration system according to the invention.

FIG. 1 is a simplified diagram of the basic components of a typical one-stage vapor-compression refrigeration system 100 according to the invention. In this cycle, a circulating refrigerant enters the compressor 110 as a vapor. In the compressor the vapor is compressed and exits the compressor superheated. The superheated vapor travels through the condenser 120 which first cools and removes the superheat and then condenses the vapor into a liquid by removing additional heat at constant pressure and temperature. The liquid refrigerant goes through an expansion valve 130 (also called a throttle valve) where its pressure abruptly decreases, causing flash evaporation and auto-refrigeration of, typically, less than half of the liquid. That results in a mixture of liquid and vapor at a lower temperature and pressure. The cold liquid-vapor mixture then travels through the evaporator 140 coil or tubes and is completely vaporized by cooling the warm return air RA returning from the refrigerated space being blown by an evaporator fan 150 across the evaporator coil or tubes. The cool supply air SA is blown into the refrigerated space. The resulting refrigerant vapor returns to the compressor inlet to complete the thermodynamic cycle. A condenser fan 160 removes condensation heat from the condenser 120. A controller 170 controls the operation of the refrigeration system and its individual components.

During operation water vapor will condensate on the evaporator 140 and form a layer of ice which will degrade the efficiency of the evaporator. The ice is removed in defrosting cycles where the compressor 110 and the evaporator fan 150 are inactivated, and a heater 180 is activated which will heat the evaporator 140. A temperature sensor 190 senses the temperature of the evaporator 140 and when it has been determined, based on the sensed evaporator temperature, that the ice is melted, the compressor 110 is again activated. When the temperature of the evaporator is sufficiently low the evaporator fan 150 is activated and the refrigeration system is in operation again.

The refrigeration system 100 can have one or more evaporator fans 150. The power of the evaporator fan motors can be controlled in two or more steps or continuously by the controller 170. For simplicity, only high speed operation and low speed operation are described, but the person having ordinary skill in the art will understand that the described method applies in general to motors with controllable speed.

Figure 2:
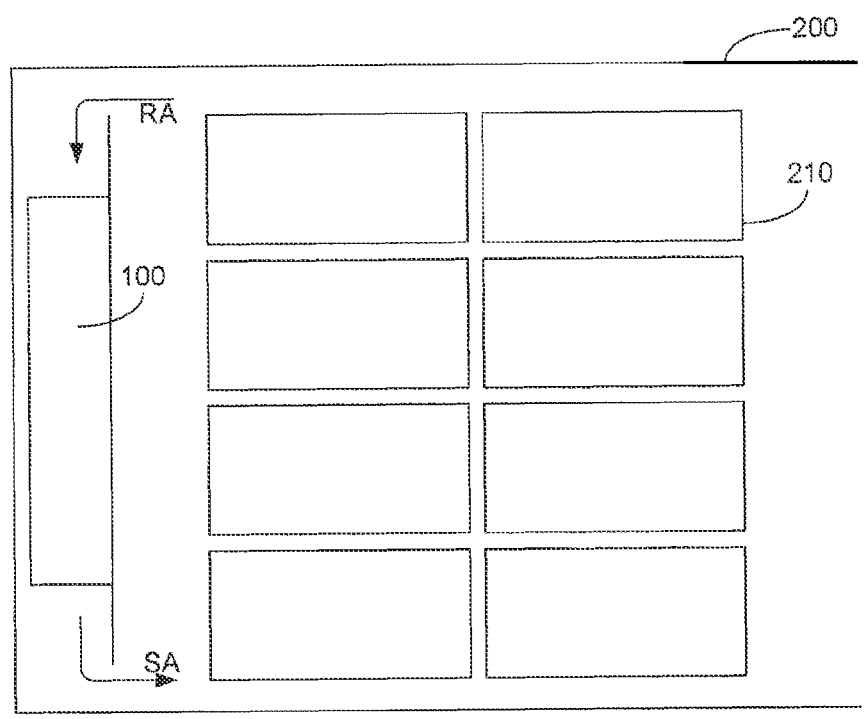
FIG. 2 shows a refrigerated container with the refrigeration system in FIG. 1 installed.

FIG. 2 shows schematically a portion of a refrigerated container 200 loaded with cargo 210 to be refrigerated. The container 200 has a refrigeration system 100 installed in one end, and the container has doors (not shown) in the opposite end for loading and unloading the cargo 210. The evaporator fan or fans 150 of the refrigeration system 100 blow refrigerated supply air SA into the container where it circulates around the cargo 210 and returns as return air RA to the refrigeration system 100.

The energy required for circulating the air in the container is ultimately dissipated as heat in the container due to friction. Depending on whether the evaporator fan 150 is operated in a low speed mode or in a high speed mode it delivers from a few hundred watts up to a few kilowatts (kW) which is dissipated as heat in the container. This energy adds to the energy that enters the container from the ambient and the heat that is generated by the cargo itself, all of which must be removed by the refrigeration system. Assuming efficiencies of 100% of both the evaporator fan and the refrigeration system, for each kW consumed by the evaporator fan another kW will be consumed by the refrigeration system.

Figure 3:
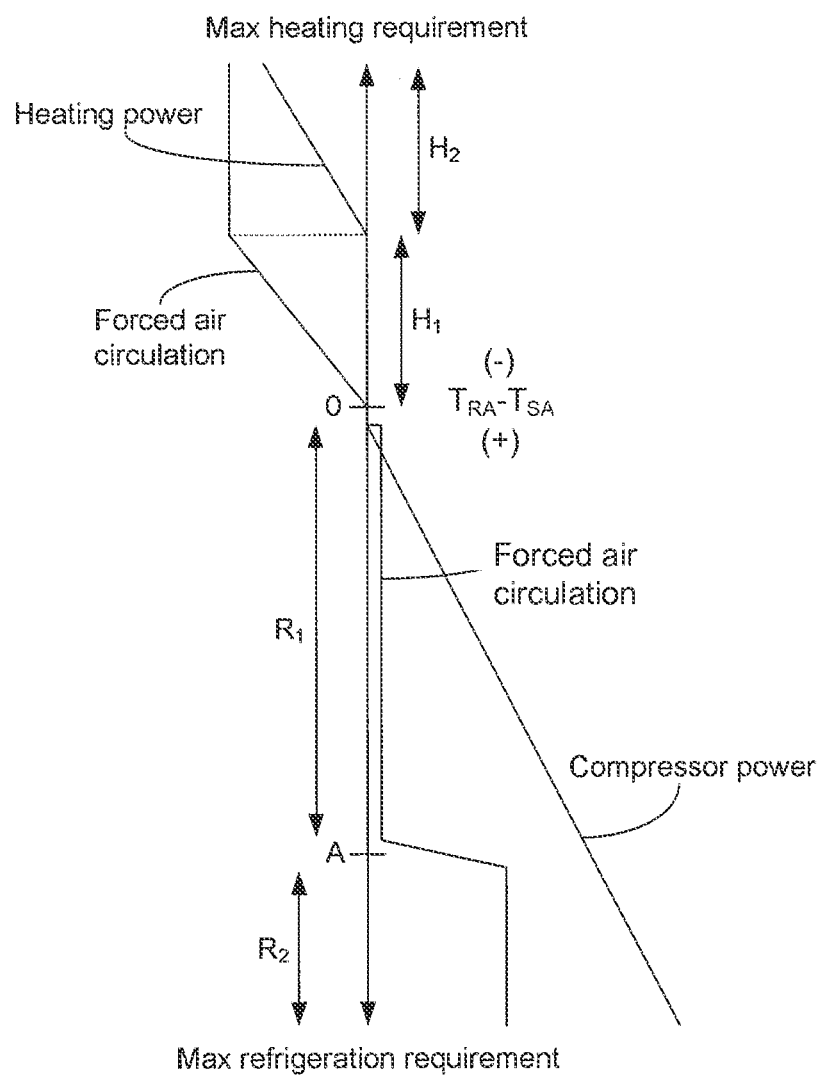
FIG. 3 is a diagram illustrating the operation of the invention in dependence on the actual requirement for heating or refrigeration.

FIG. 3 illustrates the operation of the invention in dependence on the actual requirement for heating or refrigeration. Based on observed temperature $T_{RA}$ of the return air RA and the temperature $T_{SA}$ of the supply air SA and the difference $T_{RA}$-$T_{SA}$ of the two temperatures the requirement for heating or refrigeration is calculated.

When the observed temperature difference $T_{RA}$-$T_{SA}$ indicates that neither heating nor refrigeration is required, then none of the compressor, the evaporator fan and the heater is operated, since there is nothing to correct. However, at predetermined intervals the evaporator fan is activated to circulate air in the container and to draw the return air stream past the return air temperature sensor to measure its temperature to determine whether heating or refrigeration is needed.

When a requirement for moderate heating is determined as in interval $H_1$, the evaporator fan is activated to circulate air in the container at a rate where the friction heat generated by the air flow satisfies the need for heating. This is possible with fan motors with continuously variable speed, and with other motors it can be obtained by pulse width modulation (PWM) of the electric power supplied to the motors. The speed of other (traditional) fan motors can be controlled by turning them on and off at relatively longer intervals resulting in the correct mean value of the motor speed.

At higher requirements for heating than satisfied by the evaporator fan alone, as in interval $H_2$, the evaporator fan is operated at its full capacity and supplemented by the heater 180. The heater power is adjusted so that the friction heat from the air flow plus the heat generated by the heater satisfy the need for heating. The electric power supplied to the heater can be varied e.g. by pulse width modulating the power.

When a requirement for moderate refrigeration is determined as in interval $R_1$, the compressor 110 is activated and the evaporator fan is activated to circulate the air in the container and pass it through the evaporator coil to be refrigerated. The circulation of air results in friction heat dissipated in the container which adds to the energy to be removed by refrigeration. The evaporator fan motor is therefore operated at a low speed which is sufficient to circulate the air so as to meet the requirement for refrigeration and to dissipate as little friction heat as possible. Variations in the refrigeration requirement are accommodated for by regulating the compressor power.

Letter A in FIG. 3 indicates a requirement for refrigeration determined by the set-point temperature $T_{SP}$, by the ambient conditions outside of the container, which leaks heat energy into the container, and by the heat energy generated by the cargo, all of which are known or can be determined by measurements or observations or possibly estimated. At requirements for refrigeration higher than the requirement value A it is necessary to circulate the air in the container at a high rate and correspondingly operate the evaporation fan at a high speed. Variations in the refrigeration requirement are accommodated for by regulating the compressor power.

The change in fan speed at requirement A affects the air flow through the evaporator, and therefore the compressor power is adjusted accordingly.

The interval around the requirement value A is relatively narrow and the speed of the evaporator fan motor may be varied continuously over this interval.

Various features and advantages of the invention are set forth in the following claims.

What is claimed is:

1. A method for operating a refrigeration system for a container for refrigerating chilled cargo, the method comprising:

providing a refrigeration system including a compressor, a condenser, and an evaporator connected in series, an evaporator fan associated with the evaporator, and a heater, the refrigeration system operable to discharge supply air to the container and to receive return air from the container;

determining the temperature of the supply air;

determining the temperature of the return air;

determining one of a requirement for heating and a requirement for cooling based on the temperature of the return air and the temperature of the supply air;

activating the evaporator fan when a requirement for heating is determined and increasing the speed of the evaporator fan when increased heating is determined; and activating the compressor and the evaporator fan when a requirement for cooling is determined and increasing the power supplied to the compressor and maintaining the evaporator fan at a first speed when increased cooling is determined.

2. The method of claim 1, wherein determining the requirement for heating or refrigeration is performed at predetermined time intervals.

3. The method of claim 1, further comprising deactivating the compressor and the evaporator fan when there is no requirement determined for at least one of heating and cooling.

4. The method of claim 1, further comprising activating the heater to heat the supply air when the requirement for heating is higher than can be satisfied by the evaporator fan alone, and increasing the power supplied to the heater when increased heating is determined.

5. The method of claim 1, increasing the speed of the evaporator fan to a second speed faster than the first and increasing the power supplied to the compressor when increased cooling is determined.

6. The method of claim 5, wherein the time at which the evaporator fan speed is increased from the first speed to the second speed is determined by the set-point temperature, the ambient conditions, and by the heat energy generated by the cargo within the container.

7. The method of claim 1, wherein the evaporator fan is operated by a controllable evaporator fan motor.

8. The method of claim 7, wherein the evaporator fan motor has a continuously variable speed.

9. The method of claim 8, wherein the evaporator fan motor uses a pulse width modulation (PWM) of an electric power supplied to the motor.

10. The method of claim 1, wherein determining one of a requirement for heating and a requirement for cooling includes determining one of a requirement for heating and a requirement for cooling based on a difference between the return air temperature and the supply air temperature.

11. A method for operating a refrigeration system for a container for refrigerating chilled cargo, the method comprising:
providing a refrigeration system including a compressor, a condenser, and an evaporator connected in series, an evaporator fan associated with the evaporator, and a heater, the refrigeration system operable to discharge supply air to the container and to receive return air from the container;
determining the temperature of the supply air;
determining the temperature of the return air;
determining at predetermined time intervals one of a requirement for heating and a requirement for cooling based on a difference between the temperature of the return air and the temperature of the supply air;
activating the evaporator fan when a requirement for heating is determined and increasing the speed of the evaporator fan when increased heating is determined;
activating the compressor and the evaporator fan when a requirement for cooling is determined and increasing the power supplied to the compressor and maintaining the evaporator fan at a first speed when increased cooling is determined;
deactivating the compressor and the evaporator fan when there is no requirement determined for at least one of heating and cooling;
activating the heater to heat the supply air when the requirement for heating is higher than can be satisfied by the evaporator fan alone, and increasing the power supplied to the heater when increased heating is determined; and
increasing the speed of the evaporator fan to a second speed faster than the first and increasing the power supplied to the compressor when increased cooling is determined.

* * * * *